United States Patent [19]

Kurata

[11] 4,425,587
[45] Jan. 10, 1984

[54] VIDEODISC PLAYBACK APPARATUS

[75] Inventor: Hirotaka Kurata, Tokyo, Japan

[73] Assignee: Trio Kabushiki Kaisha, Tokyo, Japan

[21] Appl. No.: 309,708

[22] Filed: Oct. 8, 1981

[30] Foreign Application Priority Data

Oct. 13, 1980 [JP] Japan .................................. 55-143460

[51] Int. Cl.³ ...................... H04N 5/76; G11B 21/08
[52] U.S. Cl. .................................. 358/335; 358/312;
358/342; 358/907; 360/10.1; 360/10.2; 360/78
[58] Field of Search .............. 358/310, 312, 313, 335,
358/126, 907, 342; 360/10.1, 11.1, 10.2, 78

[56] References Cited

U.S. PATENT DOCUMENTS 4,163,993  8/1979  Ravizza .......................... 358/312 X

*Primary Examiner*—Robert L. Richardson

*Attorney, Agent, or Firm*—Gerald J. Ferguson, Jr.; Joseph J. Baker

[57] ABSTRACT

A videodisc playback system is disclosed which enables repeated reproduction of signals recorded on a videodisc. The system comprises the usual means to mount and rotate the videodisc to be played back and a shifting device that shifts the scanning position of a read-out device in a radial direction of the videodisc. A tracking control device controls the shifting device so that the scanning position of the read-out device is on the track. Further, the system includes fast playback circuitry which causes fast playback of the videodisc by shifting playback tracks N multiple number of times, one track at a time to the next adjacent track, during one revolution of the videodisc. Repeated reproduction of signals is accomplished by circuitry connected to the fast playback circuitry that causes a predetermined number of tracks to be repeatedly played back, the predetermined number being an integral number of N.

5 Claims, 15 Drawing Figures

FIG. 3
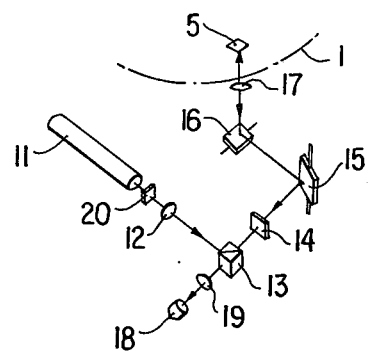
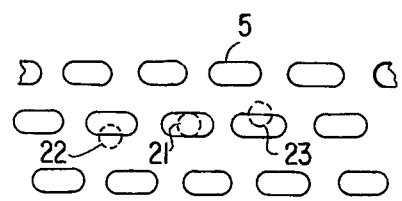
FIG. 4a
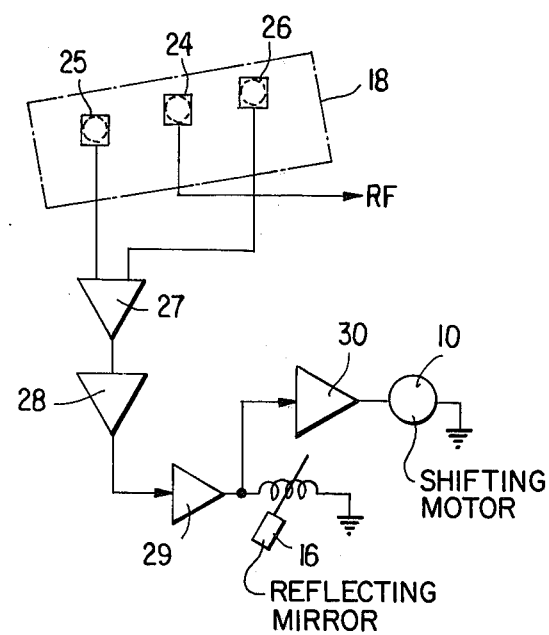
FIG. 4b

FIG. 10
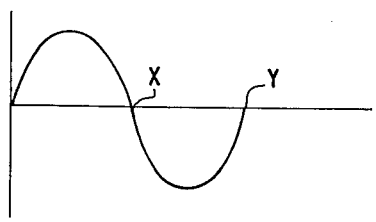
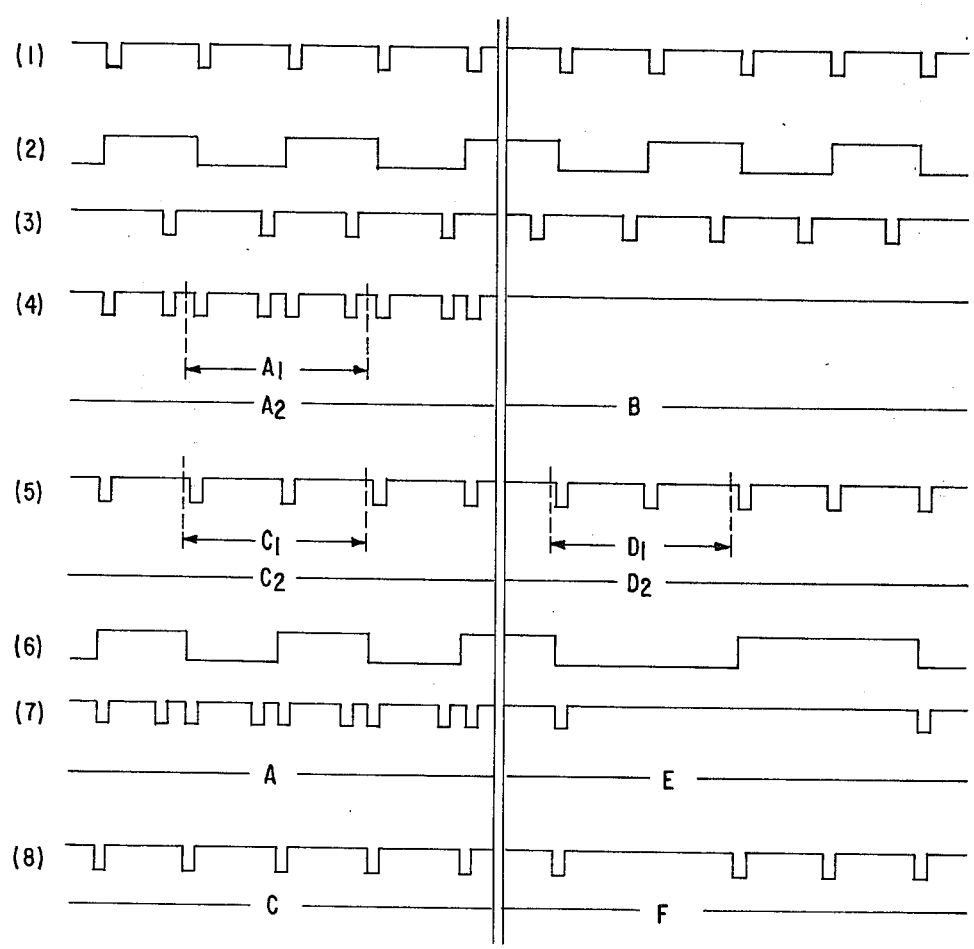
FIG. 11

FIG. 12
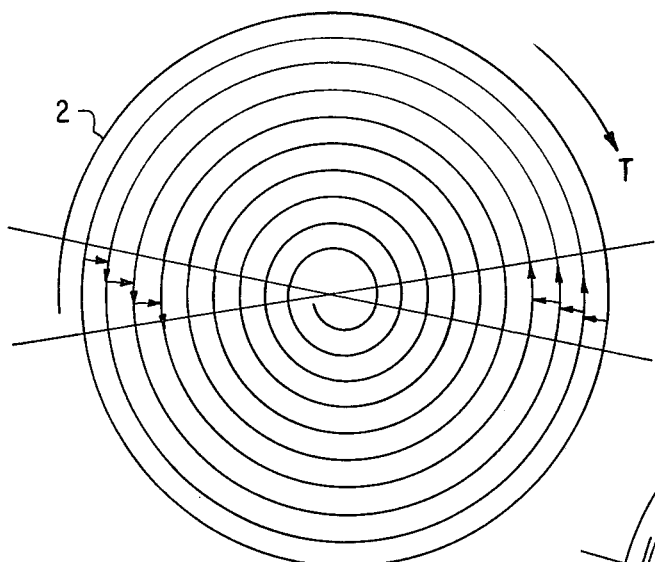
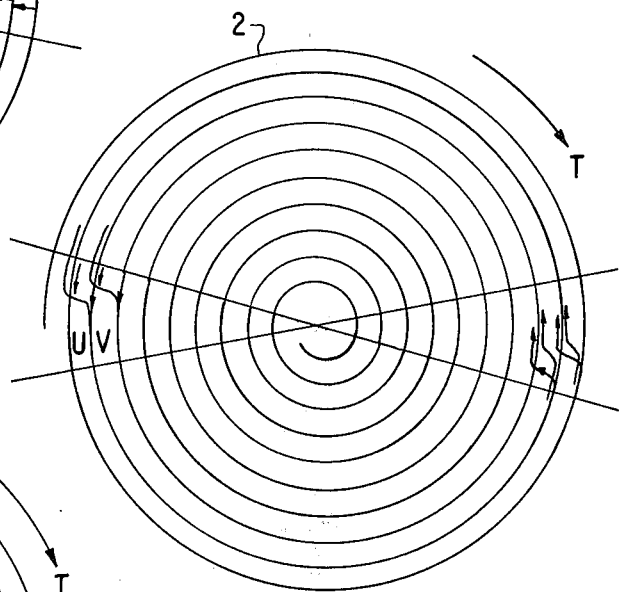
FIG. 14
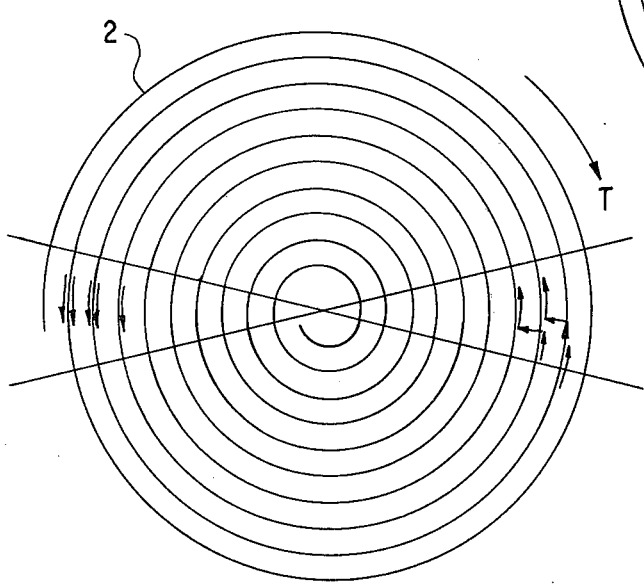
FIG. 13

VIDEODISC PLAYBACK APPARATUS

BACKGROUND OF THE INVENTION

This invention relates to a videodisc playback method that repeatedly reproduces the prescribed number of tracks a multiple number of times.

In a videodisc playback system, conditions required for reproducing a prescribed set of pictures in multiple repetitions include: (1) the starting point for repeat playback and the starting point for return remain the same each time, and no shifting occurs; (2) return time is short, and even during the return period, the picture synchronization is not disturbed, thus permitting normal viewing; and (3) video muting during the return period is unnecessary. When the duration of the repeat period is short, and video muting is used, the on-time and off-time of the pictures are frequently repeated, causing flickering of pictures that makes viewing difficult.

Previously, when reproducing a prescribed set of pictures a multiple number of times, a method used was to repeat while searching corresponding pictures in the range by referring to the key-coded signals recorded on a videodisc. However, while searching for a key-coded signal, it is necessary to turn on video muting which cannot fully meet the above-mentioned condition (3), and, as mentioned above, it causes flickering pictures that make viewing difficult.

In the case of a fast playback method in which tracking is ignored and several tracks are jumped by using a limit of an optical system or tracking servo system, the tracking servo tends to slip off, and until the tracking servo is locked in again, the read signal that reads signals from the videodisc is missed, thus causing noise to mix in the picture and throwing the picture out of synchronization. Also, the number of tracks jumped in reading is irregular due to track deviation, thus, in the end, requiring the reference to the key-coded signals. Consequently, for the duration of jitter in the picture while searching for the key-coded signals, it always becomes necessary to turn on the video muting. In this case also, the shortcoming is that the condition (3) cannot be fully met, and because of the long period of time required for searching for the key-coded signals, the above-mentioned condition (2) cannot be satisfied, either.

SUMMARY OF THE INVENTION

This invention was made in view of the above-mentioned fact, and the purpose is to produce a videodisc playback system that enables repeated reproduction of signals recorded on a videodisc in the tracks in a prescribed range using a simple configuration, which does not require the use of video muting even during this playback.

The system comprises the usual means to mount and rotate the videodisc to be played back and a shifting device that shifts the scanning position of a read-out device in a radial direction of the videodisc. A tracking control device controls the shifting device so that the scanning position of the read-out device is on the track. Further, the system includes fast playback circuitry which causes fast playback of the videodisc by shifting playback tracks N multiple number of times, one track at a time to the next adjacent track, during one revolution of the videodisc. Repeated reproduction of signals is accomplished by circuitry connected to the fast playback circuitry that causes a predetermined number of tracks to be repeatedly played back, the predetermined number being an integral number of N.

BRIEF DESCRIPTION OF THE DRAWINGS

FIG. 3 is a diagram supplied for the explanation of an optical system for signal reading of a videodisc playback system.

FIG. 4 is a diagram supplied for the explanation of the tracking control of the videodisc system.

FIGS. 9, 10, 11, 12, 13 and 14 are diagrams supplied for an explanation of the operation of one practical example shown in FIG. 7.

DETAILED DESCRIPTION OF THE PREFERRED EMBODIMENTS

Before explaining this invention, an optical videodisc playback system called a triple beam system shall be used as an example to explain the outline of the invention's tracking control method.

Figure 1:
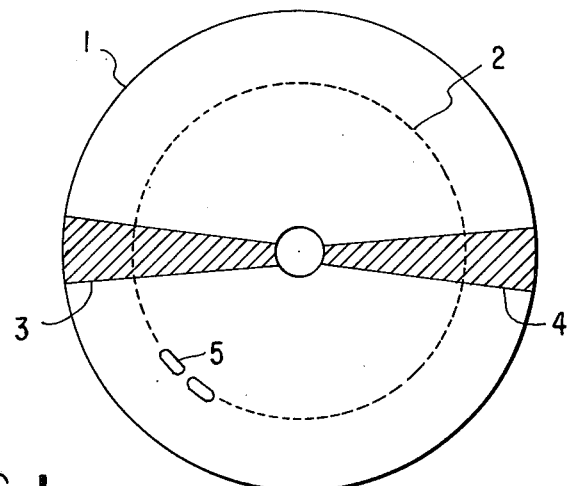
FIG. 1 is a diagram supplied for the explanation of a videodisc.

In a videodisc 1, in which revolutions are generally made constant, an FM wave containing the video signal information with the center frequency of several MHz and an FM wave with the center frequency of other low frequencies which have been modulated by audio signals are combined and recorded on the videodisc 1 in indentations arranged longitudinally to form spiral tracks. The above-mentioned indentations are called pits and are shown by 5 in FIG. 1. And, recording is made, for example, so that ½ revolution of the videodisc 1 makes one field, and one revolution makes one frame. The parts for the vertical blanking time in the composite video signal are located in the areas 3 and 4 in FIG. 1 and are arranged in a radial form with the center of the videodisc 1 as the reference.

Figure 2:
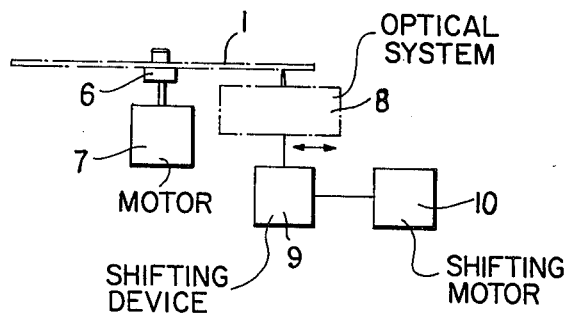
FIG. 2 is a diagram supplied for the explanation of the signal read-out system of a videodisc system.

On the other hand, as shown in FIG. 2, the videodisc playback system is equipped with a revolution control system 7 comprised of a motor for rotating the removable videodisc 1, which is affixed on a turntable 6, at a constant angular velocity, and a control circuit to control the revolutions of the said motor. It is also equipped with an optical system 8 for reading the signals from the videodisc 1 rotated by the abovementioned motor. As shown in FIG. 3, the optical system 8 consists of a laser 11 that emits a linearly polarized light flux; a raster grate 20 that forms three light fluxes; a spot lens 12; a polarizing prism 13, a ¼ wave length plate 14 that converts the light reflected by the polarizing prism 13 to a circular polarized light flux; a reflecting mirror 15 for total reflection of the circular polarized light flux from the ¼ wave length plate 14 in a direction tangential to the track; a reflecting mirror 16 that reflects the light from the reflecting mirror 15 in the radial direction of the videodisc 1; and an objective lens 17 which focuses the beam from the laser 11 onto the recorded signal surface of the videodisc 1. This beam is modulated at the recorded signal surface, returns in a reverse path taken above, converted to a linear polarized wave with the ¼ wave length plate, passed through the polarizing prism 13 and a cylindrical lens 19, and the beam from the videodisc 1 is projected onto a photoelectric converter 18 and is read as electric signals.

On the other hand, the optical unit 8 is shifted to the radial direction of the disc 1 by a shifting device 9 that is driven by a shifting motor 10. Furthermore, tracking control is done in which the turning angle of the tracking mirror 16 is controlled so that the light spot on the recorded signal surface of the videodisc 1 scans over the center of the width of the tracks 2.

Tracking control is used, as shown in FIG. 4(a), to generate tracking light beams 22 and 23 with the signal-reading light beam 21 (called playback light beam hereafter) in between. The tracking light beams 22 and 23 scan over the videodisc 1 with the playback light beam 21 to detect whether or not the playback light beam 21 is correctly scanning over the tracks.

The playback light beam 21 and tracking light beams 22 and 23 are in a set relationship of trigonometric positions: when the playback light beam 21 is in the normal position, the tracking light beams 22 and 23 are not centrally positioned in the track width, but they are set, as shown in FIG. 4(a), so that the tracking light beam 22 that precedes the playback light beam 21 is positioned off to the lower side of pits 5 in FIG. 4(a), the tracking light beam 23 that follows is positioned off to the upper side of pits 5 of FIG. 4(a), and the areas on pits 5 affected by tracking light beams 22 and 23 are equivalent. Consequently, when the playback light beam 21 is positioned off tracks 2, the areas on pits 5 affected by tracking light beams 22 and 23 will be different. In order to have the playback light beam 21 scan the center of tracks 2 by applying the above fact, the reflected beams of tracking light beams 22 and 23 are detected by photoelectric converter elements 25 and 26, respectively, as shown in FIG. 4(b), and the outputs of photoelectric converter elements 25 and 26 are inputted into a differential amplifier 27, their difference is detected and amplified to determine whether or not the playback light beam 21 is correctly received by the photoelectric converter element 24 to derive the playback RF output. The output of the differential amplifier 27 is a tracking error signal.

The tracking error signal causes the tracking mirror 16 to turn through the amplifier 28 provided with transmission characteristics compensation and the driver amplifier 29 and concurrently drives the shifting motor 10 through the driver amplifier 30 provided with transmission characteristics compensation. This control is called a tracking control.

In the case of fast playback, the output of the amplifier 29 to the target tracking unit is switched with prescribed timing to an outside signal in order to shift the target tracking unit forcibly to an adjacent track during the time that the playback light beam 21 is tracing the tracks 2 by the tracking control. By performing this operation a prescribed number of times, various kinds of track playback can be achieved: for example fast forward playback (any speed faster than double speed), reverse playback, fast reverse playback (any speed faster than double speed), slow motion (forward and reverse) playback, still image playback, etc.

Shifting tracks in a radial direction of the videodisc 1 includes a case when playback is performed in the normal playback direction and a case when the direction of playback is reversed after playing back. And, there are two standard directions for reproducing playback in the normal direction: the direction from the center toward the outer circumference of the videodisc 1 (noted forward direction hereafter) and one from the outer circumference toward the center of the disc 1 (called reverse direction hereafter). Consequently, the direction in playing back is equivalent to the reverse direction in the former case and the forward direction in the latter case. This direction is called return process, return, or return direction in this specification.

This invention relates to a playback method of reproducing prescribed pictures a multiple number of times using a means of fast playback that shifts the playback tracks, one track at a time, a multiple number of times to an adjacent track in one revolution of the videodisc 1, and it is characterized by the fact that the number of tracks to be repeatedly reproduced is set to an integer multiple of N when the speed of the above-mentioned fast playback is to be N times the normal speed.

This invention is explained below by practical examples of this invention.

Figure 5:
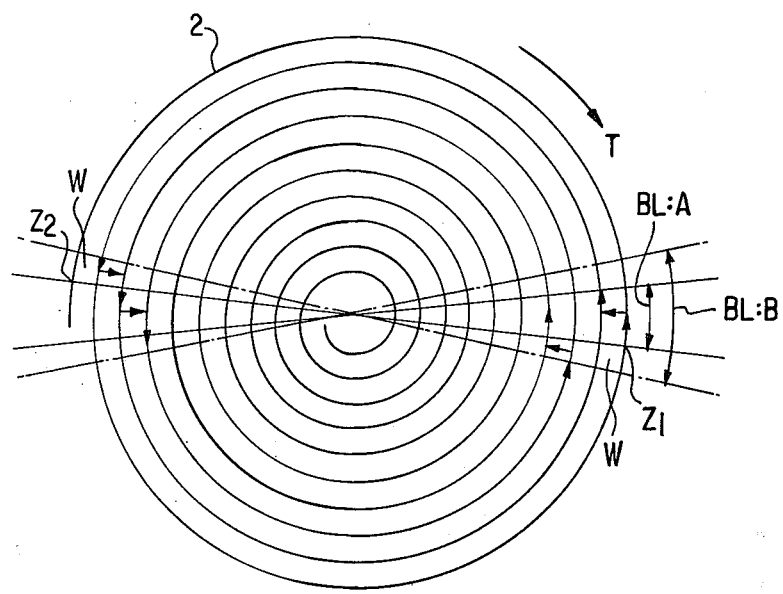
FIGS. 5 and 6 are diagrams supplied for the explanation of the method of this invention.
Figure 6:
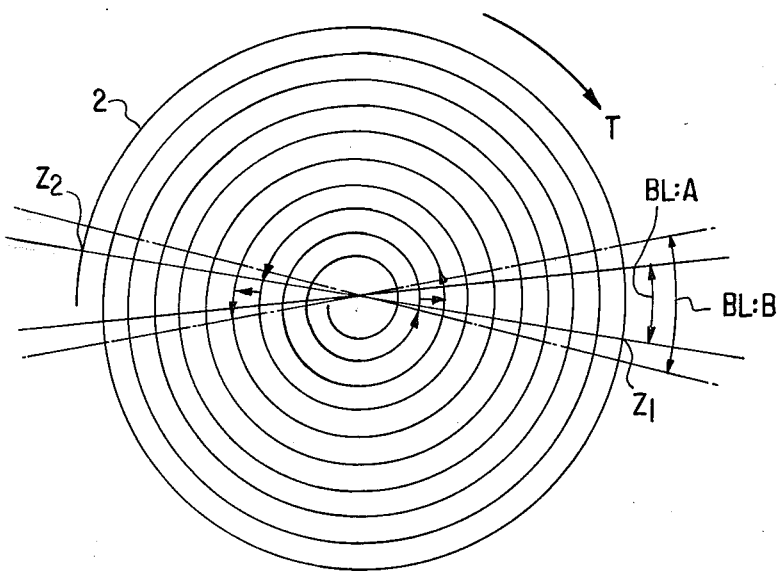

Explanation is made with examples in FIGS. 5 and 6 where the video signal in one frame is recorded in one revolution of a videodisc (noted simply a disc hereafter). First, on the disc 1, video signals are recorded in the vertical blanking zone. As discussed before, fast playback is accomplished by shifting the playback using prescribed timing to an adjacent track during one revolution of the disc 1. →T indicates the rotational direction of the disc 1.

Firstly, of the fast reverse playback speeds, the shifting state of the tracks 2 in the case of triple speed is shown in FIG. 5. As is clear from FIG. 5, playback shifts three tracks toward the center with one revolution of the disc 1, which reveals the fact that it is for reverse triple speed playback. In the case of the triple speed playback in the above diagram, playback tracks were shifted in the substantial blanking time, BL:B zone on the image of the television receiver; but the effect is the same when the playback tracks are shifted in the vertical blanking time BL:A zone on the synchronizing signal of the television receiver. When the playback tracks cannot be shifted within the vertical blanking time BL:A, it may be done within the substantial vertical blanking time BL:B on the picture of the television receiver. In this case, the playback tracks are shifted in between the substantial vertical blanking time BL:B and the vertical blanking time on the synchronizing signal BL:A, and the effects on the pictures are minimized by shifting near the end (shown by W in FIG. 5) of the video signal in the field. Also, it is obvious that five times fast playback results when the tracks are shifted two more times.

When the vertical blanking time is used in this manner, pictures are switched in field units, and an optimal result is achieved with absolutely jitter-free picture. On the other hand, since various key-coded signals are recorded in the vertical blanking time, shifting of the tracks more than the above-mentioned frequency is difficult in view of the necessity of reproducing these key-coded signals without a mistake.

Thus, in order to obtain a playback mode in a faster speed, the playback tracks are shifted within the active program zone where the first and the second field video signals are recorded. When shifted in this manner, the picture results in a combination of zonal pictures, but it is sufficient in practical use. In this case, however, since color shifting develops immediately after the shifting of tracks 2, color killer is used to make a black-and-white image in order to eliminate this problem. In the case of repeating playback as shown in this invention, the time when the color killer is working can be set to be in the return time. Therefore, by using this effect, playback range and return range can be visually distinguished. When such means are employed, it is possible to perform fast playback of any speed.

In the case of fast reverse playback, if the shifting frequency of the playback tracks in one revolution of the disc is denoted H, a playback speed of $(H-1)=N$ multiples of the normal playback speed can be obtained. In FIG. 5, the point $Z_1$ is the starting point of the first field, and the point $Z_2$ is the starting point of the second field.

Next, an example of a fast forward playback is shown in FIG. 6. As shown, when tracks are shifted, reproduction in forward triple speed is possible in one revolution of the disc 1. In addition, as in the case of FIG. 5, when the tracks are shifted two more times in the substantial blanking time of the television receiver, a forward seven times speed is obtainable. In order to perform the fast playback at faster than the forward seven times speed, the playback tracks are shifted within the active program zone of each field, as in the reverse case, and the same process is followed.

In the case of fast forward playback, when the playback tracks are shifted L times in one revolution of the disc 1, a playback speed of $(L+1)=N$ multiples of the normal playback speed can be obtained.

When such fast playback mode is used in the return process, if the number of repeated playback tracks P is set as (a) $P=K(H-1)$ in the case of forward shifting, and
(b) $P=K(L-1)$ in the case of reverse shifting
(where K is an integer), however, many times the playback repetition is made, the starting point of the return process playback (starting point of the return) and the finishing point of the return (starting point of the playback in normal direction) do not deviate.

In other words, when using a means of fast playback by shifting the playback tracks a multiple number of times, one track at a time, to an adjacent track in one revolution of the disc 1 in the return process to playback a prescribed picture in a multiple number of repetitions; and when the speed of the above-mentioned fast playback is set as an N multiple of the normal playback speed, however many times the playback is repeated, the starting point of the playback in the return process and the finishing point of the return do not deviate when the number of tracks to be repeatedly played back is set as an integer multiple of N. Moreover, repeated playback can be achieved in the same range many times and the above-mentioned condition (1) for repeated playback is satisfied.

Since it is a fast playback method of shifting the playback tracks, one track at a time to an adjacent track, playback is possible at any fast speed greater than double speed. Moreover, as the cross talk that develops between tracks in the process of playback track shifting can be used, there is no mixing of noise and no jitter in the sync level. And, as for the signal between adjacent tracks, the correlation between synchronizing signals is great because shifting of the synchronizing signals between adjacent tracks is very small, and the above-mentioned condition (2) for repeated playback is satisfied. At the same time, in the return process, only the shifting of pictures is speeded up and no unnaturalness exists. Thus, the above-mentioned condition (3) for repeated playback is also satisfied.

Fast playback in the return process does not have to be always fixed if such a method is used, and the above-mentioned conditions (1), (2), and (3) for repeated playback can be satisfied even if various speeds are combined. Moreover, it is not necessary to search for the track to be repeatedly played back, and the return operation can be finished in a very short time.

The playback speeds available in the range to be repeatedly played back include all forward and reverse normal speeds, slow motion, and step playback by a method to count the number of tracks played back. The range to be played back can also be fixed unrelated to the playback speed. And, in the case of fast playback, since the playback tracks are forcibly shifted to an adjacent track in the vertical blanking time of the composite video signal or in the substantial vertical blanking time of the picture on the televison receiver, the pictures change by field or frame units, thus causing absolutely no jitter. Moreover, the pictures are visually perceived one at a time resulting in an optimal effect. In addition, when the playback tracks are shifted in a range other than the substantial vertical blanking time, namely the program area, and fast playback is performed, the color killer circuit is operated to eliminate color shifting and the tracks are shifted in monochrome pictures. Thus, a combination of several zonal pictures results which has absolutely no problem in practical use and enables fast playback.

Next, a practical example of this invention is explained.

Figure 7:
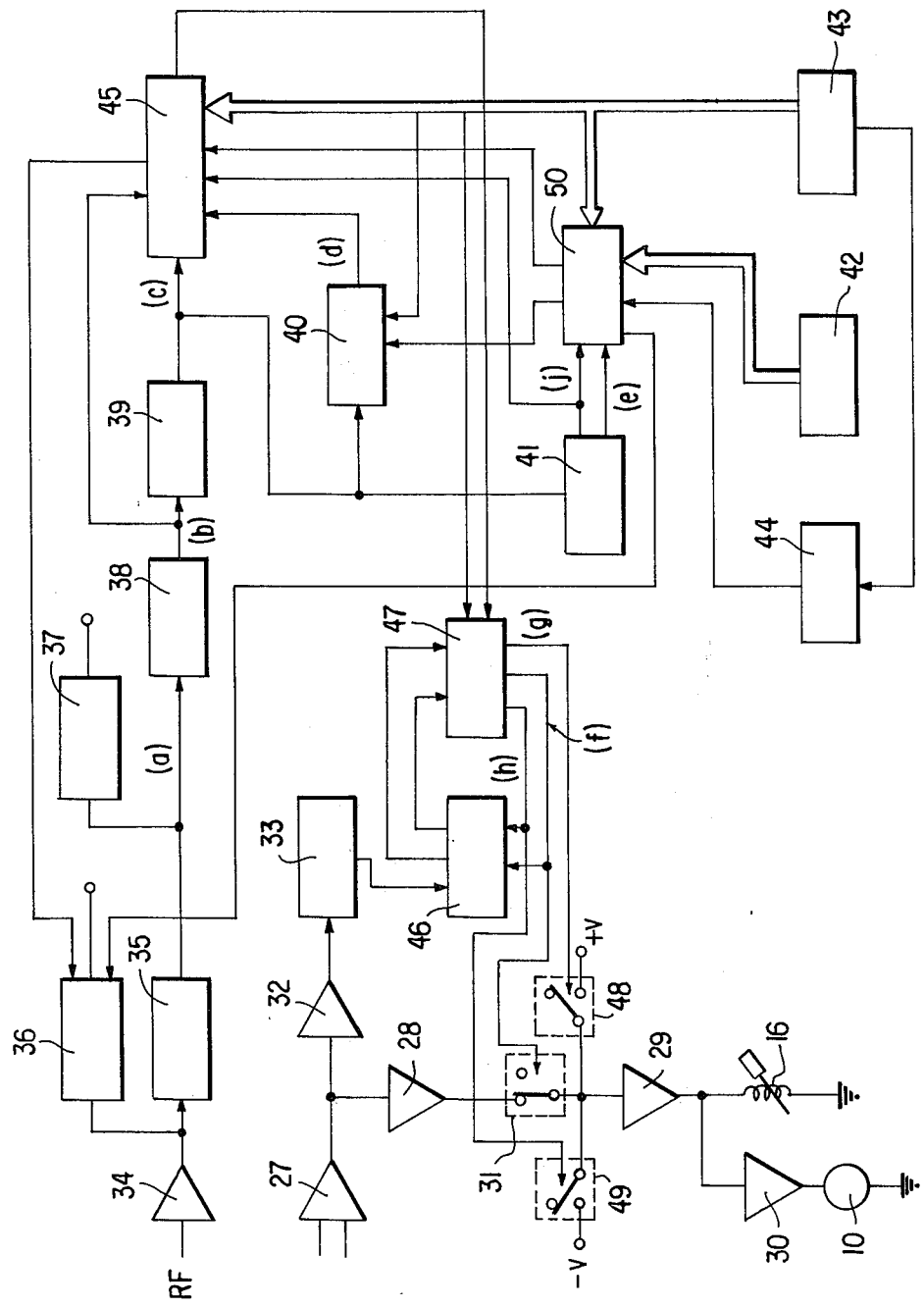
FIG. 7 is a block diagram of one practical example where the method of this invention was applied.

FIG. 7 is a block diagram of a practical example of this invention. The tracking control loop is made switchable with an external signal by installing a loop switch 31 between the output terminal of the amplifier 28 and the input terminal of the amplifier 29. And, the output signal of the differential amplifier 27 is impressed on the voltage comparator 33 through the amplifier 32. The standard voltage of the voltage comparator 33 is set to zero volts.

On the other hand, the output signal of the photoelectric converter element 24 which converts the reflected light of the playback light beam 21 to an electrical signal is amplified by the amplifier 34 and impressed on the FM detector 35 to extract the composite video signal. Since the output signal of the photoelectric converter element 24 also contains video signal information, the output signal of the amplifier 34 is subjected to a prescribed processing to obtain the audio signal output. The output terminal of the amplifier 34 is connected to the audio signal processing circuit 36 that has a muting function to mute the output signal with an external signal. Although the output signal of the FM detector 35 is a composite video signal, a video signal processing circuit 37 is connected to the output terminal of the FM detector 35 to reprocess the composite video signal in order to supply accurate composite video signals to the television receiver.

A sync separator circuit 38 extracts the synchronizing signal from the output signal of the FM detector 35. A vertical sync separator circuit 39 extracts the vertical synchronizing signal from the output signal of the sync separator circuit 38. A delay pulse generator 40 generates at least more than one delay pulse in the substantial vertical blanking time, or when the speed multiple for fast playback is large, partially in the active zone, delayed by a delay time different from the vertical synchronizing signal by referring to the vertical synchronizing signal, and depending upon the track playback mode, the generation of its output is inhibited. For example, in the cases of low-speed playback slower than the forward triple speed playback and low-speed playback of slower than the reverse normal speed, delay pulse generation is inhibited. This is discriminated by the set output of the track playback indicator 43.

A slow motion counter 41 is comprised of a frame pulse generator that generates a frame pulse equivalent to the frame cycle based on the vertical synchronizing signal and a counter that generates, for example, one output with two frame pulse counts at ½ slow motion time, and outputs this frame pulse and a counter output for counting the number of tracks. A repeat playback range setter 42 sets a number that corresponds to the number of repeat playback tracks, P, explained with FIGS. 5 and 6. The track playback indicator 43 indicates track playback that corresponds to various track modes and has switches that correspond to various track modes. The various operating switches are comprised of those that generate a normal high-level output (the high-level output is noted as H or "1" hereafter) and an active low-level output (the low-level output is noted as L or "0" hereafter), that is, an H output when the operating switch is not depressed and an L output when it is depressed, and those that generate a normal L output and and active H output. The track playback indicator also has a mode memory that receives outputs from the operating switches and maintains that state. When a certain track mode is indicated from the operating switch, the output that corresponds to this mode in the mode memory output is maintained at an H output state until another mode is indicated, and outputs that correspond to other modes are all reset to an L output, and a track mode is indicated by maintaining that state.

The track playback indicator 43 is configured such that among the track modes, the fast forward playback mode and the fast reverse playback mode, for example, are effective only during the time when the operating switches are depressed and are unrelated to the mode memory. The operating switch for the fast forward playback mode generates L outputs when depressed and H outputs when not depressed; and the playback switch for the fast reverse playback mode generates H outputs when depressed and L outputs when not depressed.

A repeat playback indicator 44 indicates repeat playback and has two states: a state to output a repeat playback indicator signal and a state that does not output a repeat playback indicator signal. A track playback signal generator 45 uses the output signals of the sync separator circuit 38, vertical sync separator circuit 39, and the delay pulse generator 40 as inputs and divides the timing pulse per each field, the timing pulse per each frame, and the timing pulse per each frame that is in the same phase as the frame pulse in the above-mentioned slow motion counter 41, respectively, with different dividing ratios to make timing pulses. Generator 45 processes these timing pulses with the delay pulse from the above-mentioned delay pulse generator 40 to make various kinds of timing pulses; gates these various kinds of timing pulses with the signals from the slow motion counter 41, the track playback indicator 43, and the later-mentioned repeat operation signal generator 50, and with the track playback signal indicated by the track playback indicator 43; and generates the timing signals required for the designated track playback. Also, by means of the indicator signal other than the standard speed playback indication from the track playback indicator 43, it impresses audio muting signals from the track playback indicator signal generator 45 to the audio signal processing circuit 36.

A loop-closing signal generator 46 outputs zero-crossing signals and loop switch-closing signals using the output signal of the voltage comparator 33, the loop switch-opening pulse signal that opens the loop switch 31 of the later-discussed forced driving pulse generator 47, and the second switch change-over pulse signal that closes the second change-over switch 49 as inputs. The forced driving pulse generator 47 receives the zero-crossing signal and the loop switch closing signal from the loop-closing signal generator 46, inputs the timing pulse from the track playback signal generator 45, and impresses the signal to switch the loop switch 31, the signal to switch the first change-over switch 48, and the signal to switch the second change-over switch 49 to loop switch 31, the first change-over switch 48, and the second change-over switch 49, respectively, in synchronism with the timing pulse from the track playback signal generator 45.

The first change-over switch 48 is switched from the contact position in FIG. 7 by the active low signal impression and impresses +V voltage to the target tracking unit for the switched duration. In this practical example, the target tracking unit is driven in the reverse direction by this +V voltage impression. The second change-over switch 49 is switched from the contact position in FIG. 7 by the active high signal impression and impresses −V voltage to the target tracking unit for the switched duration. In this practical example, the target tracking unit is driven in the forward direction by this −V voltage impression.

A repeat operation signal generator 50 repeats the track mode playback indicated by the track playback indicator 43 for the number of tracks that correspond to a set value of the repeat range setter 42 when the repeat playback is indicated by the repeat playback indicator 44.

Figure 8:
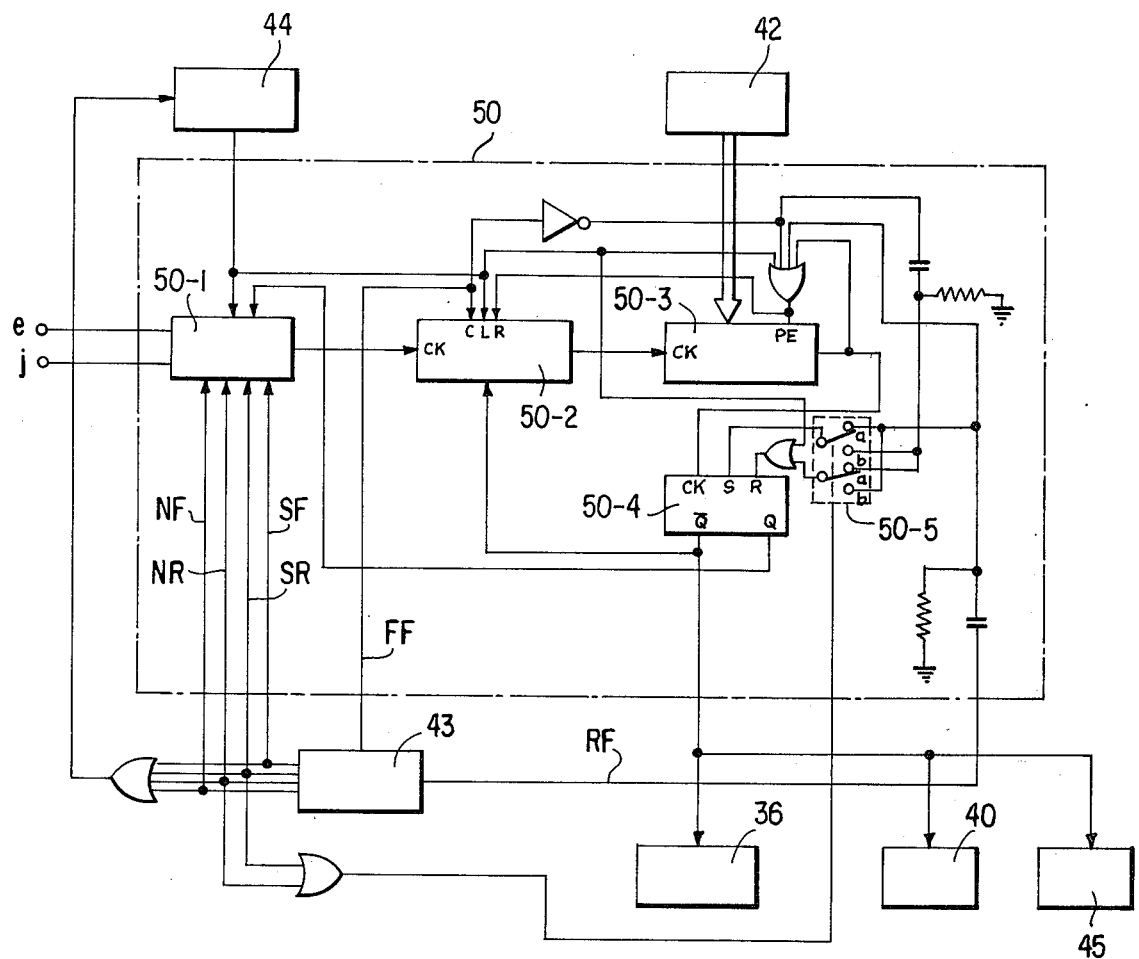
FIG. 8 is a block diagram of a repeat operation signal generator used in the practical example shown in FIG. 7.

The repeat operation signal generator 50 is configured, for example, as shown in FIG. 8. It is comprised of the input selector circuit 50-1 that uses the frame pulse e and the counter output j from the slow motion counter 41 as inputs and selects and outputs the input signals e or j as determined by the normal speed forward playback indicator signal (NF), normal speed reverse playback indicator signal (NR), slow motion forward playback indicator signal (SF), and slow motion reverse playback indicator signal (SR) from the track playback indicator 43 at the input time of the signals indicating repeat playback from the repeat playback indicator 44. The variable modulo-counter 50-2 counts the outputs of the input selector circuit 50-1. The presettable down counter (called presettable counter hereafter) 50-3 counts the outputs of the variable modulo-counter 50-2 by presetting the selected value from the repeat range setter 42, the flip-flop 50-4 that reverses the output state by inputting the output signal of the presettable counter 50-3, and the change-over switch 50-5 that is interlock-switched when the track playback indication of the track playback indicator 43 is in normal speed reverse playback or slow motion reverse playback indication. Since the variable modulo-counter 50-2 generates its output caused by the $\overline{Q}$ output of the flip-flop 50-4, the count is switched. And, the variable modulo-counter 50-2 is cleared by the fast forward indicator signal (FF) of the track playback indicator 43, repeat playback indicator signal of the repeat playback indicator 44, and the preset signal of the presettable counter 50-3. The presettable counter 50-3 presets the value of the repeat playback range setter 42 according to the repeat playback indicator signal of the repeat playback indicator 44, the inverse of the fast forward playback indicator signal, the differentiated fast reverse playback indicator signal (FR) from the track playback indicator 43, or the output signal of the presettable counter 50-3. The flip-flop 50-4 is set or reset through the change-over switch 50-5 by the differentiated inverse fast forward playback signal or differentiated fast reverse playback signal of the track playback indicator 43. Here, it is configured such that when the normal speed reverse playback mode or slow motion reverse playback mode is indicated, the change-over switch 50-5 is switched to contact point b resetting the flip-flop 50-4 with the fast reverse playback indicator signal (FR) and setting the flip-flop 50-4 with the fast forward playback indicator signal (FF); and when the normal speed reverse playback mode or slow motion reverse playback mode is not indicated, the change-over switch 50-5 is switched to the contact point a, setting the flip-flop 50-4 with the fast reverse playback indicator signal and resetting the flip-flop 50-4 with the forward fast playback indicator signal (FF).

The $\overline{Q}$ output of the flip-flop 50-4 is outputted to the delay pulse generator 40, the track playback signal generator 45, and the audio signal processing circuit 36. The delay pulse generator 40 generates a delay pulse with the Q output of the flip-flop 50-4. And, the track playback signal generator 45 operates an internal gate with the Q output of the flip-flop 50-4 and controls the generation of the output pulse that corresponds to the delay pulse from the delay pulse generator 40 using the indicator signal from the track playback indicator 43.

Next, the delay pulse control of the delay pulse generator 40 and the discrimination of forward or reverse direction by the forced driving pulse in the track playback indication mode are explained together. When the fast reverse playback is indicated from the track playback indicator 43 directly to the track playback signal generator 45 and the delay pulse generator 40, the track playback signal generator 45 outputs an output pulse signal that corresponds to the vertical synchronizing signal and the delay pulse, respectively. This signal is inputted to the forced driving pulse generator 47 through an OR gate and is determined as shifting in the reverse direction. And, when the fast forward playback is indicated from the track playback indicator 43 to the track playback signal generator 45 and the delay pulse generator 40, the output of the delay pulse generator 40 and the output from the track playback signal generator 45 of the output pulse signal that corresponds to the delay pulse are inhibited. When the forward direction is played back, and repeat is indicated, thus changing the Q output of the flip-flop 50-4, a signal appears at the $\overline{Q}$ output of the flip-flop 50-4 to the delay pulse generator 40, the delay pulse is impressed on the track playback signal generator 45, and the track playback signal generator 45 generates an output pulse that corresponds to the delay pulse. And, in the case of normal speed reverse playback or slow motion reverse playback, the above-mentioned delay pulse generation is inhibited and no delay pulse is generated.

The forced driving pulse generator 47 is standardized to shift the target tracking unit in the reverse direction in the case of an output signal from the track playback signal generator 45. However, by providing an OR gate that performs a logical sum operation of the normal speed reverse playback indicator signal and the slow motion reverse playback indicator signal from the track playback indicator 43, a NAND gate that performs a logical product operation by inputting the output of the said OR gate and the fast reverse playback indicator signal, and an AND gate that inputs the output of the said NAND gate and the fast forward playback indicator signal, the sequence for outputting signals g and h is changed by using the output pulse signal from the track playback signal generator 45 as a signal for forward direction only when the output signal of the said NAND gate is present.

Next, the operation of this practical example is explained. Unless specially noted, explanation is made hereafter using as examples three times the normal speed (noted a triple speed hereafter) for the fast speed and ⅓ the normal speed playback for the slow motion playback.

Figure 9:
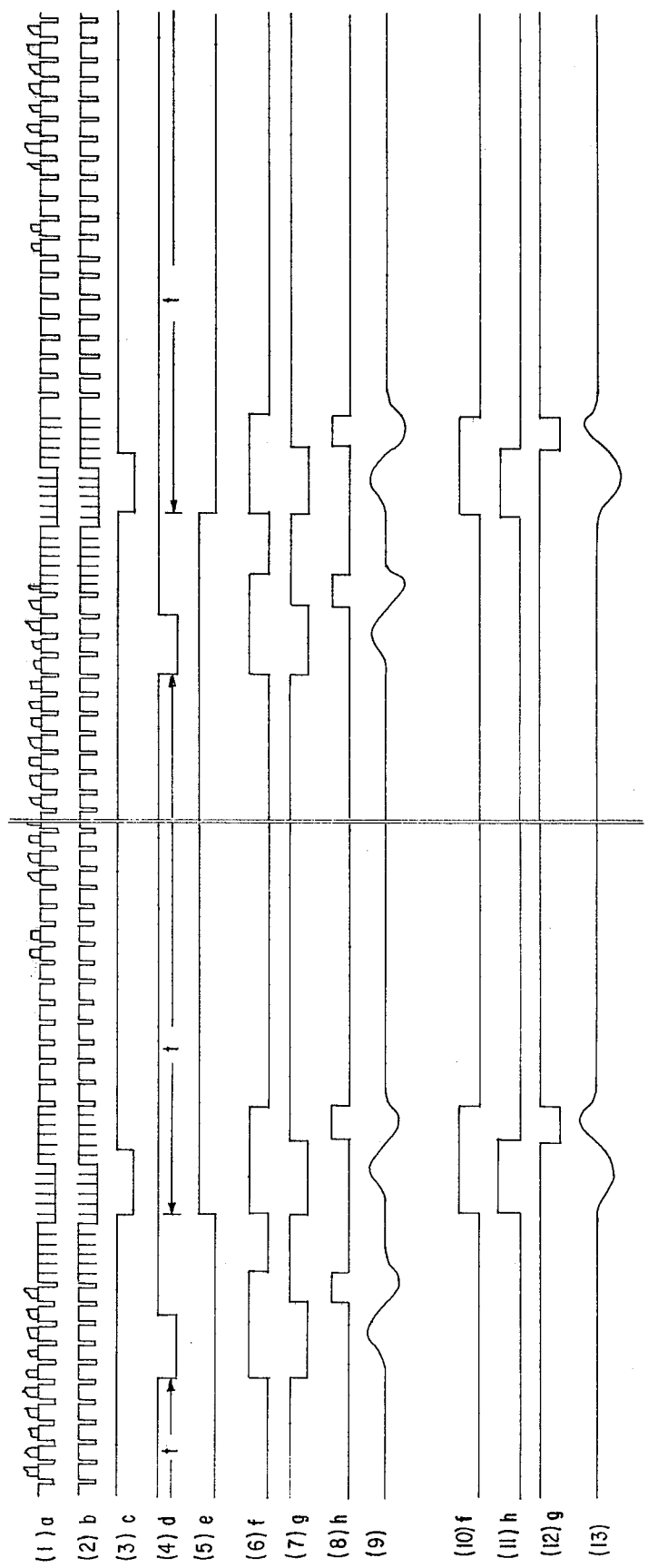

The input signal of the FM detector 35 is generally a composite of FM waves containing video signal information with the center frequency of several MHz and FM waves modulated by an audio signal with other low frequencies as the center signal. The FM detector 35 FM-detects only the video signal information from this input signal and outputs a composite video signal a at its output terminal. This composite video signal a is shown in FIG. 9(1). The sync separator circuit 38 extracts a synchronizing signal b from FIG. 9(1). The synchronizing signal b is as shown in FIG. 9(2). The vertical sync separator circuit 39 extracts a vertical synchronizing signal c from the synchronizing signal b. The vertical synchronizing signal c is as shown in FIG. 9(3). The delay pulse generator 40 generates a delay pulse d shown in FIG. 9(4) delayed by a delay time τ based on the vertical synchronizing signal c. In FIG. 9(4), the delay pulse d is shown as one pulse per field. However, for multiple speed playback of, for example, five times or more in reverse, or six times or more in forward, a multiple number of pulses that correspond to the multiplied playback speed are generated.

On the other hand, the frame pulse e formed in the slow motion counter 41 is a pulse of equal period to the frame cycle as shown in FIG. 9(5) by referring to the vertical synchronizing signal c shown in FIG. 9(3). And, the vertical synchronizing signal c and the delay pulse d become the trigger pulse reference at the time of fast playback indication designated by the track playback indicator 43. The track playback signal generator 45 outputs various kinds of timing pulses that correspond to the input signals of the forced driving pulse generator 47. These signals are explained later.

Next, for the convenience of explanation, the shifting of tracks in the case of forced shifting of playback tracks by an output from the forced driving pulse generator 47 is explained using the forward normal speed and the triple speed playback as examples. First, in the case of the forward normal speed, since the trick playback signal generator 45 does not generate an output, the forced driving pulse generator 47 does not generate an output. The contact points of the loop switch 31, the first and the second change-over switches 48 and 49 are positioned as shown in FIG. 7, and normal tracking control is performed in which the tracking error signal of the differential amplifier 27 controls the target tracking unit comprised of a tracking mirror 16 and a shifting motor 10 through the loop switch 31, thus effecting the playback in forward normal speed.

Next, explanation is made in the case of reverse triple speed. The forced driving pulse generator 47 determines the fact that the shifting is in reverse direction by the signal from the track playback indicator 43. And, the track playback signal generator 45 outputs, during the three continuous substantial blanking times, for example, a vertical synchronizing signal in the blanking time with the continuous first field, a delay pulse d and a vertical synchronizing signal in the substantial blanking time with the continuous second field, and a delay pulse d in the substantial blanking time with the continuous first field. The delay pulse d is generated within the substantial vertical blanking time. As a result of the vertical synchronizing signal outputted first from this trick playback signal generator 45, the forced driving pulse generator 47 generates the signal f that switches the loop switch 31 to an open state. The loop switch 31 is opened by signal f. Due to the opening of the loop switch 31, the tracking control loop opens. Concurrent with the output of the signal f, signal g that switches the first change-over switch 48 is generated. The signals f and g are shown in FIGS. 9(6) and (7). As the first change-over switch 48 is switched by the signal g, +V voltage is impressed at the target tracking unit, and the target tracking unit is forcibly driven in the reverse direction. Due to this driving, the tracking error signal outputted from the differential amplifier 27 increases as shown in FIG. 10. The position for the output at point X shown in FIG. 10 corresponds to the time when the playback light beam 21 reaches exactly the mid-point toward the adjacent track in the reverse direction. And, the output position shown by point Y in FIG. 10 corresponds to the time when the playback light beam 21 was positioned over the adjacent track in the reverse direction. FIG. 9(9) shows the amplified tracking error signal of the amplifier 32.

This tracking error signal is compared with the zero voltage at the voltage comparator 33, the signal g is reset by the output signal of the voltage comparator 33 at point X, and signal h is outputted. Because of the resetting of signal g, the first change-over switch 48 opens, and the outputted signal h causes the second change-over switch 49 to close, and instead of +V voltage, −V is impressed at the target tracking unit. Thus, the target tracking unit is driven in the forward direction, The signal h is as shown in FIG. 9(8). Here, signal h is impressed instead of signal g to effect forward driving in order to overcome the inertia of the target tracking unit to prevent shifting past the adjacent track in the reverse direction.

Due to this action, the shifting speed of the target tracking unit is suppressed and shifts to the point Y shown in FIG. 10, namely the immediately neighboring track in the reverse direction. Upon reaching point Y, a signal is generated from the forced driving pulse generator 47 from the loopclosing signal generator 46, signals f and h are reset, the loop switch 31 returns again to the contact position shown in FIG. 7, the second change-over switch 49 is opened, the impression of −V voltage on the target tracking unit ceases, thus closing the tracking loop, and tracking control is executed by the tracking error signal.

In the substantial vertical blanking time of the next field, the same actions take place as above, and shifting occurs twice in the reverse direction one track at a time; and by the next delay pulse d, shifting of one track occurs similarly in the reverse direction in the substantial blanking time of the next field. Consequently, by the rotation of one track portion, playback tracks are shifted three tracks in essence in the reverse direction, and triple speed reverse playback is achieved as shown in FIG. 5.

Now, a case of forward triple speed playback is explained. The forced driving pulse generator 47 determines the fact that shifting is in forward direction by the signal from the track playback indicator 43. And, the track playback signal generator 45 outputs a signal that corresponds to the vertical synchronizing signal in the two continuous vertical blanking times. As a result of the signal from the track playback signal generator 45, the forced driving pulse generator 47 outputs signal that opens the loop switch 31 by switching the loop switch 31. The tracking control loop opens due to this signal. Concurrent with the output of signal f, signal h that switches the second change-over switch 49 is generated. Signals f and h in this case are shown in FIG. 9(10) and (11). When the second change-over switch 49 is switched by signal h, −V voltage is impressed at the target tracking unit, and the target tracking unit is forcibly driven in the forward direction. Due to this driving, the tracking error signal outputted from the differential amplifier 27 decreases resulting in a waveform symmetrical to the waveform shown in FIG. 10 with respect to the abscissa, and the position of the output point X corresponds to the time when the playback light beam 21 has reached exactly the middle position toward the adjacent track in the forward direction. The output position shown by point Y corresponds to the time when the playback light beam 21 is positioned over the adjacent track in the forward direction. FIG. 9(13) shows a waveform for the amplified tracking error signal of the amplifier 32.

This tracking error signal is compared with zero voltage at the voltage comparator 33, signal h is reset by the signal from the loop closing signal generator 46 produced from the output signal of the voltage comparator 33 at point X, and signal g is outputted. Because of the resetting of signal H, the second change-over switch 49 opens, and the first change-over switch 48 is closed due to the outputted signal g, and +V is impressed at the target tracking unit. Then, the target tracking unit is driven in the reverse direction, and the shifting of the target tracking unit is suppressed. Signal g is as shown in FIG. 9(12). Then, the playback light beam is shifted to point Y in FIG. 10, in this case, to the immediate neighboring track in the forward direction. Upon reaching point Y, the loop-closing signal generator 46 detects that fact and generates an output. Signals f and g are reset by this output, the loop switch 31 returns again to the contact position shown in FIG. 7, the first change-over switch 48 opens, the +V voltage impressed on the target tracking unit ceases, thus closing the tracking loop, and tracking control is performed by the tracking error signal.

In the vertical blanking time where the next field continues, the same operation as above occurs, and shifting of one track occurs in the forward direction. Consequently, by the rotation of one tract portion, playback tracks are shifted three tracks in essence in the forward direction, and triple speed forward playback is achieved as shown in FIG. 6.

Shifting of playback tracks at forward normal speed, reverse triple speed, and forward triple speed have been explained. In the case of faster playback, the operations are the same, but only more delay pulses are generated from the track playback signal generator 45.

Next, repeat playback is explained. Explanation is made regarding the case of forward playback at normal speed being selected, and repeat playback is being performed in the return process in triple speed reverse playback. In this case, the change-over switch 50-5 is switched to the side of contact point a.

When there was a picture you wish to see again during forward playback at normal speed, repeat indication is performed by depressing the repeat playback indicator 44. Before the repeat playback indication is executed, the input selection by the input signal selector circuit 50-1 is ceased, and the input selector circuit 50-1 does not generate an output. When repeat playback indication is made from the repeat playback indicator 44, the variable modulo-counter 50-2 is cleared, the presettable counter 50-3 is preset, and the flip-flop 50-4 is reset. By resetting flip-flop 50-4, its $\overline{Q}$ output results in a "1" output, and the setting of the variable modulo-counter is switched by the $\overline{Q}$ output. Suppose that the repeat playback range setter 42 is set to repeat the repeat range of thirty tracks, that is one minute. The variable modulo-counter 50-2 is then set to the 5-count counter by the $\overline{Q}$ output. In this example, the preset value of the presettable counter 50-3 is two counts.

On the other hand, the input selector circuit 50-1 selects frame pulses among the frame pulses from the slow motion counter 41, which are inputted into the input selector circuit 50-1 by the repeat playback indicator signal, and the slow motion count pulses, and outputs them to the variable modulo-counter 50-2. The variable modulo-counter 50-2 counts these frame pulses and generates an output to the presettable counter 50-3 at every five counts. When five counts are performed twice, the presettable counter 50-3 generates an output, and the flip-flop 50-4 inverts its output.

While the variable modulo-counter 50-2 is making ten counts, the delay pulse from the delay pulse generator 40 is not inhibited, but outputted to the track playback signal generator 45, and the track playback signal generator 45 outputs an output pulse that corresponds to the vertical synchronizing signal and the delay pulse. Meanwhile, the forced driving pulse generator 47 had already discriminated the process to be reverse mode and shifts the playback track at reverse triple speed as mentioned above using the output pulse signal from the track playback signal generator 45. In other words, the playback tracks are shifted three tracks in reverse direction in one frame pulse time. Therefore, by the time the abovementioned variable molulo-counter 50-2 have made ten counts, three tracks × 10=30 tracks had been returned at reverse triple speed. In other words, thirty tracks designated by the repeat playback range setter 42 had been returned.

Next, as a result of the flip-flop 50-4 being inverted by the output of the presettable counter 50-3 and the output $\overline{Q}$ changing to "1", the input selector circuit 50-1 is in the track mode designated by the track playback indicator 43, and in this case, outputs the input that corresponds to the forward playback at normal speed, i.e., frame pulse. Meanwhile, the variable modulo-counter 50-2 is set to fifteen counts by the inversion of the flip-flop 50-4, and the presettable counter 50-3 is preset again by the count-out output of the presettable counter 50-3.

Consequently, after completing the fast playback of thirty tracks by reverse triple speed, the variable modulo-counter 50-2 counts the frame pulse outputted from the input selector circuit 50-1 again. At this counting time, the variable modulo-counter 50-2 generates an output pulse every fifteen counts, the presettable counter 50-3 inputs one pulse every fifteen counts, and when the variable modulo-counter 50-2 executed fifteen counts twice, it generates an output, inverts the flip-flop 50-4, and the Q output of the flip-flop 50-4 changes to "1".

During this time, the track playback signal generator 45 does not generate an output because forward playback at normal speed is indicated, and as mentioned above, the target tracking unit is controlled by the tracking error signal, and forward playback is executed at normal speed for thirty tracks.

When a different track playback is not indicated from the track playback indicator 43, the variable modulo-counter 50-2 is again set to the 5-count counter by the $\overline{Q}$ output of the flip-flop 50-4 until the repeat playback indicator 44 indicates to stop the repeat playback, and the presettable counter 50-3 is preset to a 2-count by its own count-out signal. And, the input selector circuit 50-1 selects a frame pulse and shifts playback tracks at reverse triple speed as mentioned before.

As is clear from the above statement, the repeat playback range, that is the starting point of the return process and the entering point into forward playback at normal speed do not change. Consequently, the forward normal speed playback and the reverse triple playback continue in the same range many times until otherwise designated.

FIG. 11 shows a typical input pulse counted by the variable modulo-counter 50-2 in this case and the signal outputted by the track playback signal generator 45. FIG. 11(1) shows a vertical synchronizing signal, FIG. 11(2) is a frame pulse inputted to the input selector circuit 50-1 from the slow motion counter 41, FIG. 11(3) is the delay pulse of the delay pulse generator 40, FIG. 11(4) is the pulse outputted by the track playback signal generator 45 to the forced driving pulse generator 47. In FIG. 11(4), $A_1$ shows the waveform of the outputted pulse by the track playback signal generator 45 during one frame pulse time for reverse triple speed. The playback tracks are shifted in the reverse direction one track with every pulse, and the shifting is as shown in FIG. 5. $A_2$ shows a 10-frame pulse duration, and the $A_1$ duration occurs ten times in the $A_2$ duration. Therefore, in the $A_2$ duration, 30-track reverse triple speed results in the 10-frame pulse time, which corresponds to a duration of ten counts by the variable modulo-counter 50-2 and the presettable counter 50-3. The duration B shows the forward process when the variable modulo-counter 50-2 and the presettable counter 50-3 have completed ten counts, and the variable modulo-counter 50-2 counts frame pulses and the track playback signal generator 45 does not generate outputs. The $\overline{Q}$ output of flip-flop 50-4 is impressed on the audio signal processing circuit 36 as a muting output, and audio muting is turned on in the return process.

Next, an explanation is made regarding a case when reverse playback at normal speed is selected, and repeat playback is executed in the return process at forward triple speed playback. In this case, the change-over switch 50-5 is switched to the contact point b.

During reverse playback at normal speed, the input selector circuit 50-1 inhibits its input until the repeat playback indicator signal is outputted from the repeat playback indicator 44, and the input selector circuit 50-1 does not generate an output. When the repeat playback indicator signal is outputted, the input selector circuit 50-1 selects and outputs a frame pulse. The variable modulo-counter 50-2 is cleared by the repeat playback indicator signal, and the presettable counter 50-3 is preset. And, the flip-flop 50-4 is reset. Because of the resetting of flip-flop 50-4, the variable modulo-counter 50-2 is set to the 5-count counter. Here, an example of setting the presettable counter 50-3 to 2-count is shown as before.

The frame pulse outputted from the input selector circuit 50-1 is counted by the variable modulo-counter 50-2, the presettable counter 50-3 generates an output at counting the 5-count twice of the variable modulo-counter 50-2, and the flip-flop 50-4 inverts the output. During the time when the variable modulo-counter 50-2 is counting the total of ten, the track playback signal generator 45 outputs an output pulse that corresponds to the vertical synchronizing signal to the forced driving pulse generator 47. On the other hand, the forced driving pulse generator 47 has already discriminated the process to be a forward mode, and shifts the playback tracks at forward triple speed as mentioned above using the output pulse signal from the track playback signal generator 45.

In other words, the playback tracks are shifted three tracks in forward direction in one frame pulse time. Therefore, by the time the above-mentioned variable modulo-counter 50-2 have made ten counts, three tracks $\times 10 = 30$ tracks had been returned at forward triple speed. In other words, thirty tracks designated by the repeat playback range setter 42 had been returned.

Next, as a result of the flip-flop 50-4 being inverted by the output of the presettable counter 50-3 and the output Q output changing to "1", the input selector circuit 50-1 is in the track mode designated by the track playback indicator 43, and in this case, outputs the input that corresponds to the reverse playback at normal speed, i.e., frame pulse. Meanwhile, the variable modulo-counter 50-2 is set to fifteen counts by the inversion of the flip-flop 50-4, and the presettable counter 50-3 is preset again by the count-out output of the presettable counter 50-3.

Consequently, after completing the fast playback of thirty tracks by forward triple speed, the variable modulo-counter 50-2 counts the frame pulse outputted from the input selector circuit 50-1 again. At this counting time, the variable modulo-counter 50-2 generates an output every fifteen counts, the presettable counter 50-3 inputs one pulse every fifteen counts, and when the variable modulo-counter 50-2 executes fifteen counts twice, it generates an output, inverts the flip-flop 50-4, and the $\overline{Q}$ output of the flip-flop 50-4 changes to "1".

During this time, since reverse playback at normal speed is indicated for the track playback signal generator 45, an output that corresponds to the vertical synchronizing signal is outputted from the track playback signal generator 45 to the forced driving pulse generator 47. And, the forced driving pulse generator 47 had already discriminated the reverse mode and shifts the playback tracks one track at a time in the reverse direction for every output pulse that corresponds to a vertical synchronizing signal. The state of this shifting is as shown in FIG. 12.

These playback track shifting signals are generated for every field, and track shifting occurs for each field. However, the substantial shifting of the tracks is such that the playback tracks are shifted one track in reverse by the output pulse that corresponds to two vertical synchronizing signals. This is equivalent to a shifting of the playback tracks in essence one track in the reverse direction by one frame pulse, and when the variable modulo-counter 50-2 has counted thirty, the playback track has just shifted thirty tracks in the reverse direction, and reverse normal playback will be executed on the same tracks where the forward triple speed playback was made in the return process. This continues until another different track indicator signal is outputted from the track playback indicator 43, or until the cease signal for the repeat playback indication is outputted.

FIG. 11(5) is a pulse outputted from the track playback signal generator 45 to the forced driving pulse generator 47 in the above-mentioned case. $C_1$ duration and $C_2$ duration are those in the forward triple speed playback time in the return process. The $C_1$ duration shows a pulse waveform outputted by the track playback signal generator 45 in the one frame pulse time for track shifting, the $C_2$ duration shows a 10-frame pulse duration, and $C_1$ duration occurs ten times in the $C_2$ duration. During the $C_1$ duration, the playback tracks shift three tracks in the forward direction, and thirty tracks are shifted in the $C_2$ duration. And, the $D_1$ and $D_2$ durations are those in the playback time of reverse normal speed. The $D_1$ duration shows a pulse waveform outputted by the track playback signal generator 45 to the forced driving pulse generator 47 in the 1-frame pulse time, the $D_2$ duration shows a 30-frame pulse duration, and the $D_1$ duration occurs thirty times in the $D_2$ duration. During this $D_1$ duration, the playback track shifts one track in the reverse direction, and thirty tracks are shifted in the $D_2$ duration. In this case, the output of the delay pulse generator 40 is inhibited by the output of the track playback indicator 43. And, the $\overline{Q}$ output of the flip-flop 50-4 mutes the audio signal.

Next, an explanation is made regarding the case when $\frac{1}{2}$ normal speed slow motion forward playback is selected, and repeat playback is executed in the return process at reverse triple speed playback. In this case, the change-over switch 50-5 is switched to the contact point a.

The operations of the variable modulo-counter 50-2, presettable counter 50-3, and flip-flop 50-4 by the repeat playback indicator signal and the reverse triple speed playback indicator signal are the same as in the case of the abovementioned reverse triple speed playback.

After reverse triple speed playback has been performed on thirty tracks in the return process, the track playback indicator 43 is indicating $\frac{1}{2}$ slow motion forward playback. Thus, according to that indicator signal, the input selector circuit 50-1 selects an output signal j from the slow motion counter 41 and outputs it to the variable modulo-counter 50-2.

The slow motion counter 41 generates a counter output determined by the slow motion speed. For example, $\frac{1}{2}$ slow motion playback can be achieved by playing back twice on the same track. Thus, $\frac{1}{2}$ slow motion forward playback is performed by stopping, while tracking one revolution, one of the pulses that shifts the playback tracks in the reverse direction which had been used for playing back twice on the same track for every two frame pulses, by playing back the same track again twice, and by repeating such an operation subsequently.

Therefore, in the case of ½ slow motion forward play, the output of the slow motion counter 41 is inputted to the input selector circuit 50-1 as a counter input j obtained by dividing the frame pulse by one-half.

Consequently, the variable modulo-counter 50-2 counts this output j. The method of counting is the same as the explanations made thus far. Thus, the output j is as shown in FIG. 11(6) as an E duration, and when the variable modulo-counter 50-2 has executed fifteen counts twice, the presettable counter 50-3 generates an output and the reverse triple speed playback is again repeated.

In the case of ½ slow motion forward playback, the output signal outputted to the forced driving pulse generator 47 by the track playback signal generator 45 according to the indicator signal from the track playback indicator 43 is as shown in FIG. 11(7) E duration. A portion of the output pulse signal corresponding to the vertical synchronizing signal is output-inhibited. The track shifting mode in the case of ½ slow motion forward playback is typically as shown in FIG. 13. Duration A in FIG. 11(6) and (7) is identical to the duration $A_2$ in FIGS. 11(2) and (4). Consequently, during ½ slow motion forward playback, the playback tracks will shift in essence thirty tracks in the 60-frame pulse time, which agrees with track shifting in the case of reverse triple speed playback in the return process.

Next, an explanation is made regarding the case when ½ normal speed slow motion reverse playback is selected and repeat playback is performed in the return process in forward triple speed playback. In this case, the change-over switch 50-5 is switched to the contact point b.

The operations of the variable modulo-counter 50-2, presettable counter 50-3, and the flip-flop 50-4 according to the repeat playback indicator signal and the forward triple speed playback indicator signal are the same as in the case of the above-mentioned forward triple speed playback.

After forward triple speed playback is performed for thirty tracks in the return process, the track playback indicator 43 is indicating ½ slow motion reverse playback. Thus, the input selector circuit 50-1 selects the output signal j from the slow motion counter 41 according to the indicator signal, inverts it, and outputs it to the variable modulo-counter 50-2. The output j of the slow motion counter 41 is the same as mentioned above. And, the variable modulo-counter 50-2 is set to a 15-counter. Therefore, the variable modulo-counter 50-2 makes fifteen counts of the rise of the inverted pulse of output j twice whereby the presettable counter 50-3 generates the output, and the return process begins again.

Now, in the case of ½ slow motion reverse playback, the output signal of the track playback signal generator 45 to the forced driving pulse generator 47 caused by the signal from the track playback indicator 43 is as shown in FIG. 11(8) F duration. A portion of the output pulse signal corresponding to the vertical synchronizing signal is output-inhibited. The track shifting mode in the case of ½ slow motion reverse playback is shown typically in FIG. 41, and one track is played back twice also. The C duration of FIG. 11(8) is identical to the $C_2$ duration of FIG. 11(5). In this case, it is equivalent, in essence, to counting UV of the shifting portion of the tracks as shown in FIG. 14.

In this case also, ½ slow motion reverse playback and repeat playback at forward triple speed in the return process are performed on the same 30 tracks. And, turning on audio muting in the return process is the same as in the previous case. Also, since the return process is always a fast playback, the signal from the track playback indicator 43 to the track playback signal generator 45 may be used to generate an audio muting signal from the track playback signal generator 45 when the fast triple speed playback command is on in the return process during that period.

Explanation was made above regarding the case of the repeat track number of thirty, but it need not be limited to thirty tracks. For example, in the case of repeating ninety tracks (three seconds), it is done by setting the preset of the presettable counter 50-3 to output at count six. The count value of the variable modulo-counter 50-2 need not be fifteen counts either, and other values may be used. However, this value should be the integer multiples of N when the fast playback speed is N-multiples of the normal playback speed.

Repeat playback may be performed as follows differing from the above-mentioned method. While normal speed forward playback is being performed according to the track playback indicator 43, fast forward playback is executed with fast forward indication by indicating fast forward playback while the repeat playback indicator 44 is indicating repeat playback. In this case, the change-over switch 50-5 is at the contact point a, and the $\overline{Q}$ output of the flip-flop 50-4 is set to "1". Therefore, as soon as fast forward indication is stopped, shifting occurs to a fast reverse state whereby the delay pulse which had been inhibited during fast forward indication will be generated, returning the set number of tracks at fast reverse from the position where the above-mentioned fast forward indication was stopped and entering again to the normal speed forward playback, and repeat playback of normal speed forward playback for the set number of tracks and the return fast reverse playback are performed.

The same repeat playback as above can be performed during slow motion forward playback also. While normal speed forward playback is being performed similarly with the repeat playback indication, the repeat playback of a set number of tracks can be executed by setting to fast reverse playback indication whereby flip-flop 50-4 changes to the set state, and as soon as fast reverse playback indication is stopped, shifting occurs to normal speed forward playback executing continual normal speed forward playback the prescribed number of tracks, then shifting to fast reverse playback in the return process, and repeating the normal speed forward playback again and fast reverse playback in the return process. Or, when fast forward is indicated while normal speed reverse playback is being executed, leaving the repeat playback indication alone, the flip-flop 50-4 is set, and when the fast forward indication was stopped after the playback tracks had been shifted to the prescribed track at fast forward, the flip-flop 50-4 is still set. Consequently, from the above-mentioned prescribed position of the track, a repeat playback state of normal speed reverse playback, fast forward playback in the return process results, and repeat playback of a set number of tracks is performed. Or, when fast reverse playback is indicated while normal speed reverse playback is being executed, leaving the repeat playback indication alone, the flip-flop 50-4 is reset, and when the fast reverse indication is stopped after the playback tracks have been shifted by fast reverse playback, repeat playback of a set number of tracks is performed using the track position where the fast reverse indication stopped as the starting point for the return process and by returning a set number of tracks in the forward direction by fast forward playback, and by performing normal speed reverse playback and return process fast forward.

By using such means as above, the position one wishes to repeat is easily found with fast playback while viewing the picture. When search is made in the fast forward mode, the past picture is retraced by shifting immediately to the return process from the picture sought and found. Then after playing back a set range by normal speed forward playback, fast reverse playback is performed again in the return process. And, when the picture one wishes to repeat was sought in fast reverse playback mode, forward playback of the set range is performed immediately at normal speed in the direction the search was made, and after playing back the above-mentioned prescribed range, one begins fast reverse playback again in the return process.

Although the above explanation was made regarding a case of optical playback, the method is applicable to other playback methods, for example, a capacitance or mechanical playback method. Also, the above cases used a combination of a variable modulo-counter and a presettable counter as counters for counting the playback range, the operation can also be performed by using one counter.

As explained above, when this invention is used, a prescribed range of tracks of a videodisc can be repeatedly played. And, the range of tracks can be easily set by a preset value of a preset counter. When the fast playback speed is an N multiple of the normal playback speed, and the prescribed number of tracks is set to an integer multiple of N, repeated playback of the same range can be performed at all times regardless of the number of repeated playbacks made without shifting the positions of the starting and finishing points of the repeat playback. And, video muting need not be turned on at any playback time. Repeat playback can be performed with any of the playback speeds such as normal speed, slow motion, step, etc. A region one wishes to playback repeatedly by fast playback can be found easily, and the repeat location can also be determined with ease. In addition, it is applicable to all videodisc playback systems in which playback is performed with fixed revolutions of the videodisc.

What is claimed is:

1. In a videodisc playback system of the type having means to mount and rotate a videodisc on which are recorded composite video signals in a spiral track, sensing means for reading the video signals from the spiral track to effect playback at a normal speed, shifting means for shifting the position of said sensing means along a radial of the videodisc, control means for controlling said shifting means so that (a) the scanning position of the read-out device is on the track or (b) the sensing means is shifted from one track to another, the improvement where said control means includes means for fast playback of said videodisc by a factor N times faster than the normal speed where N is an integer equal to or greater than 2 including means for shifting tracks, one track at a time, to the next adjacent track, during one revolution of said videodisc, where the shifting means is shifted $N-1$ tracks for fast forward playback and $N+1$ times for fast backward playback, and means responsive to said fast playback means for repeatedly playing back a predetermined number of tracks where said predetermined number is an integral multiple of N.

2. The improvement according to claim 1 further comprising means for causing the played back signal to be displayed in monochrome.

3. The improvement according to claims 1 or 2 wherein N has more than one value.

4. The improvement according to claim 1 wherein said means for causing a predetermined number of tracks to be repeatedly played back comprises counting means for counting the number of tracks travelled during a return movement of said read-out device, and when the counted value equals said predetermined number, reversing the playback direction of said read-out device, said counting means further counting the number of tracks travelled from the beginning of playback at the returned position of said read-out device, and when the counted value equals said predetermined number, initiating the return movement of said sensing means whereby the signals on the tracks between the start and finish of said return movement of said sensing means are repeatedly played back.

5. The improvement according to claim 4 further comprising means for selecting forward or reverse playback directions, said means controlling the direction of movement of said sensing means during said return movement so that during the repeat operation, when playback is in the forward direction and the track position to be played back is shifted in the forward direction by fast forward playback, the position where said sensing means was shifted is made the starting point of said return movement and the playback is performed for said predetermined number of tracks, and when the track position to be played back is shifted in the reverse direction, the position where said sensing means was shifted to is made the finishing point of said return movement and playback is performed in the forward direction, and when playback is in the reverse direction, the track position where said sensing means is shifted in the reverse direction by fast reverse playback is made the starting point of said return movement and playback in said return movement is performed for said predetermined number of tracks, and when the track position of said sensing means is shifted in the forward direction, the position where said sensing means is shifted to is made the finishing point of said return movement and playback is performed in the reverse direction.

* * * * *